US012041544B2

(12) United States Patent
Gurumoorthy et al.

(10) Patent No.: US 12,041,544 B2
(45) Date of Patent: Jul. 16, 2024

(54) WIRELESS NETWORK HAVING AN ENHANCED WAKE-UP SIGNAL

(71) Applicant: Apple Inc., Cupertino, CA (US)

(72) Inventors: Sethuraman Gurumoorthy, San Ramon, CA (US); Fangli Xu, Beijing (CN); Adesh Kumar, San Jose, CA (US); Birgit Breining, Munich (DE); Dawei Zhang, Saratoga, CA (US); Haijing Hu, Los Gatos, CA (US); Longda Xing, San Jose, CA (US); Naveen Kumar R. Palle Venkata, San Diego, CA (US); Sarma V. Vangala, Campbell, CA (US); Sigen Ye, Whitehouse Station, NJ (US); Srirang A. Lovlekar, Fremont, CA (US); Wei Zeng, Saratoga, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,830

(22) PCT Filed: Oct. 14, 2020

(86) PCT No.: PCT/CN2020/120930
§ 371 (c)(1),
(2) Date: Sep. 24, 2021

(87) PCT Pub. No.: WO2022/077279
PCT Pub. Date: Apr. 21, 2022

(65) Prior Publication Data
US 2023/0239791 A1 Jul. 27, 2023

(51) Int. Cl.
*H04W 52/02* (2009.01)
*H04W 76/28* (2018.01)

(52) U.S. Cl.
CPC ..... *H04W 52/0229* (2013.01); *H04W 52/0216* (2013.01); *H04W 76/28* (2018.02)

(58) Field of Classification Search
CPC ......... H04W 52/0229; H04W 52/0216; H04W 52/028; H04W 76/28; Y02D 30/70
See application file for complete search history.

(56) References Cited

U.S. PATENT DOCUMENTS

2019/0320490 A1  10/2019  Liu
2020/0322918 A1  10/2020  Shih
(Continued)

FOREIGN PATENT DOCUMENTS

CN    110958668 A    4/2020
CN    111328458 A    6/2020
(Continued)

OTHER PUBLICATIONS

OPPO, "Remaining issues on DCP," 3GPP TSG-RAN WG2 Meeting #109 electronic, R2-2000412, Mar. 6, 2020 (Jun. 3, 2020).

*Primary Examiner* — Farid Seyedvosoghi
(74) *Attorney, Agent, or Firm* — Blank Rome LLP

(57) ABSTRACT

A method for power saving, comprising: establishing a radio resource control (RRC) connection with a wireless device, transmitting, to the wireless device, configuration information indicating a discontinuous reception (DRX) cycle time, a DRX on time period, and an offset time, transmitting an enhanced wake-up signal (EWUS) monitoring occasion for a DRX cycle, the EWUS monitoring occasion based on the offset time and the DRX on time period, determining that the wireless device can skip monitoring one or more future EWUS monitoring occasions, transmitting, during a first DRX cycle, a EWUS for the wireless device during the EWUS monitoring occasion associated with the first DRX cycle, the EWUS indicating that the wireless device can skip the one or more future EWUS monitoring occasions, and (Continued)

skipping transmitting the EWUS to the wireless device during the one or more future EWUS monitoring occasions.

16 Claims, 13 Drawing Sheets

(56) References Cited

U.S. PATENT DOCUMENTS

| | | | |
|---|---|---|---|
| 2020/0367167 A1* | 11/2020 | Nam | H04W 52/0229 |
| 2021/0099954 A1 | 4/2021 | Agiwal | |
| 2022/0022137 A1* | 1/2022 | Xue | H04W 24/08 |
| 2023/0164693 A1 | 5/2023 | Kim | |
| 2023/0209462 A1* | 6/2023 | Tsai | H04W 52/0235 |
| | | | 370/311 |
| 2023/0239791 A1 | 7/2023 | Gurumoorthy | |
| 2023/0276362 A1* | 8/2023 | Reial | H04W 56/0015 |
| | | | 370/311 |

FOREIGN PATENT DOCUMENTS

| | | |
|---|---|---|
| CN | 111328461 A | 6/2020 |
| CN | 111630801 A | 9/2020 |
| CN | 111757434 A | 10/2020 |
| WO | 2020032726 A1 | 2/2020 |
| WO | 2020060696 A1 | 3/2020 |
| WO | 2020060890 A1 | 3/2020 |

* cited by examiner

WIRELESS NETWORK HAVING AN ENHANCED WAKE-UP SIGNAL

FIELD

The present application relates to wireless devices and wireless networks, and more particularly to apparatus, systems, and methods for generating and handling an enhanced wake up signal (WUS).

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to apparatuses, systems, and methods for power saving, comprising: establishing a radio resource control (RRC) connection with a wireless device; transmitting, to the wireless device, configuration information indicating a discontinuous reception (DRX) cycle time, a DRX on time period, and an offset time; transmitting an enhanced wake-up signal (EWUS) monitoring occasion for a DRX cycle, the EWUS monitoring occasion based on the offset time and the DRX on time period; determining that the wireless device can skip monitoring one or more future EWUS monitoring occasions; transmitting, during a first DRX cycle, an EWUS for the wireless device during the EWUS monitoring occasion associated with the first DRX cycle, the EWUS indicating that the wireless device can skip the one or more future EWUS monitoring occasions, and skipping transmitting the EWUS to the wireless device during the one or more future WUS monitoring occasions.

Another aspect relates to apparatuses, systems, and methods for power saving comprising: establishing a radio resource control (RRC) connection with a wireless system, entering an RRC connected mode based on the established RRC connection, receiving, from the wireless system, configuration information indicating a discontinuous reception (DRX) cycle time, a DRX on time period, and an offset time, determining a wake-up signal (WUS) monitoring occasion for a DRX cycle based on the offset time and the DRX on time period, monitoring, during a first DRX cycle, for a WUS during the WUS monitoring occasion associated with the first DRX cycle, receiving, from the wireless system, the WUS during the WUS monitoring occasion, determining that the WUS indicates that the wireless device skip one or more future WUS monitoring occasions, and skipping monitoring for the WUS based on the indicated skipped one or more future WUS monitoring occasions.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings, in which.

Figure 1:
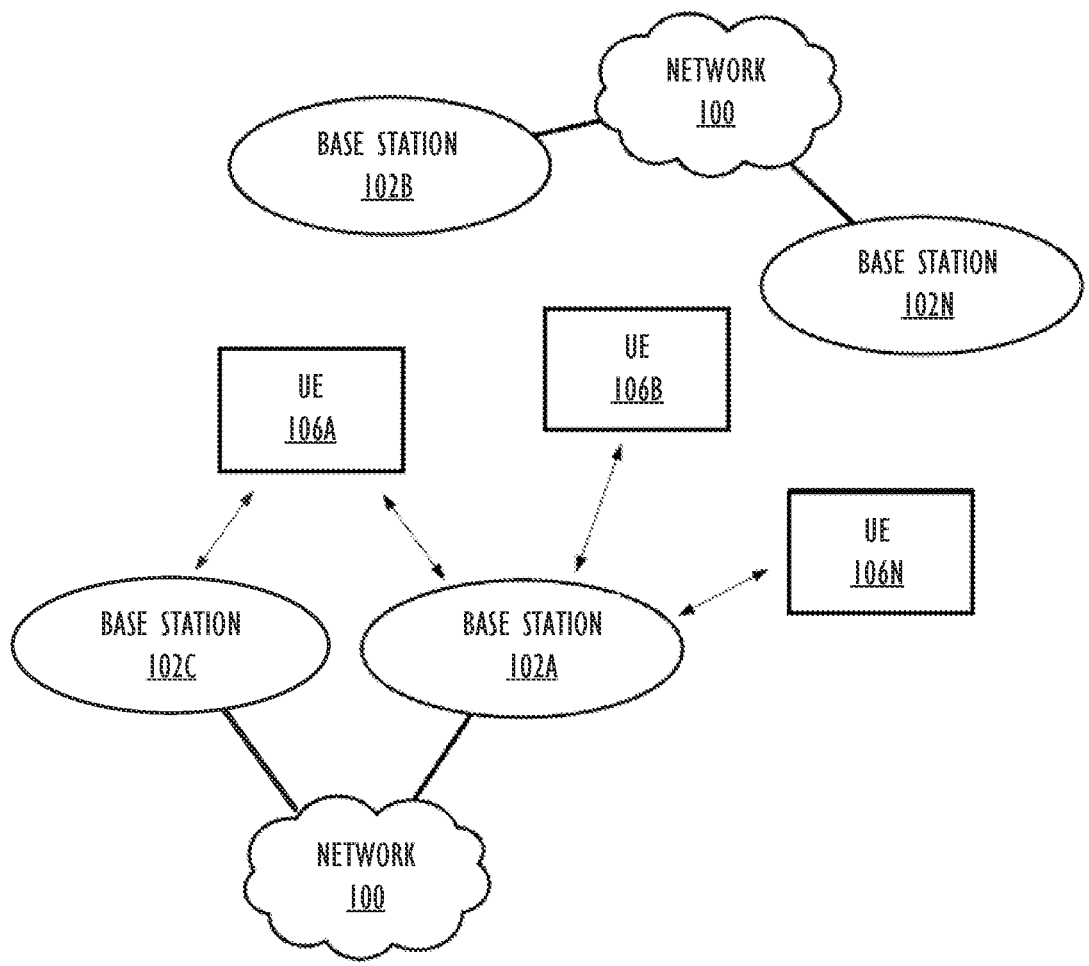
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In some wireless communications systems, a wireless device may successfully connect to a wireless node and enter an RRC connected state. In this RRC connected state, the wireless device may monitor a physical downlink control channel (PDCCH) to obtain control information, scheduling information, paging information, etc. Rather than constantly monitoring for the PDCCH, power consumption may be reduced by monitoring for the PDCCH according to a schedule during defined monitoring instances. Power consumption may be further reduced by allowing the wireless device to skip some scheduled PDCCH monitoring instances. In some cases, a wake-up signal (WUS) may be used to indicate that a wireless device should monitor an upcoming PDCCH monitoring instance. However, monitoring for a WUS uses more power than not monitoring for the WUS, and there is a desire to reduce power consumption for wireless devices.

As will be explained further herein, an enhanced WUS may be used to indicate that one or more WUS monitoring instances may be skipped.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc., a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although some aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although some aspects are described in the context of LTE or 5G NR, references to "eNB," "gNB," "nodeB," "base station," "NB." etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner. e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As show-n, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, w % bile base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granulanties of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, HSDPA, HSUPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
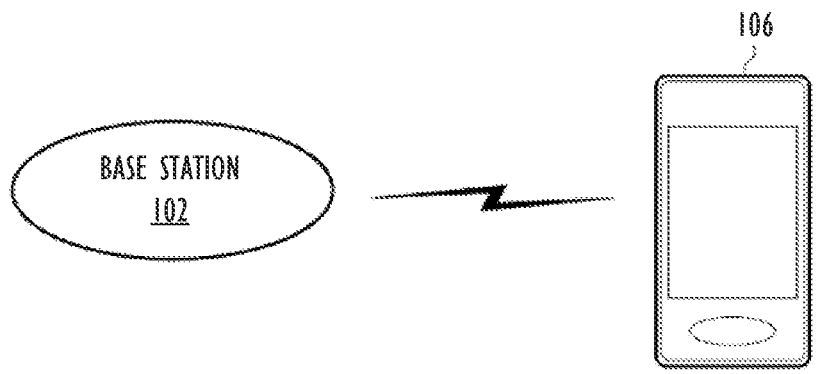
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some embodiments, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
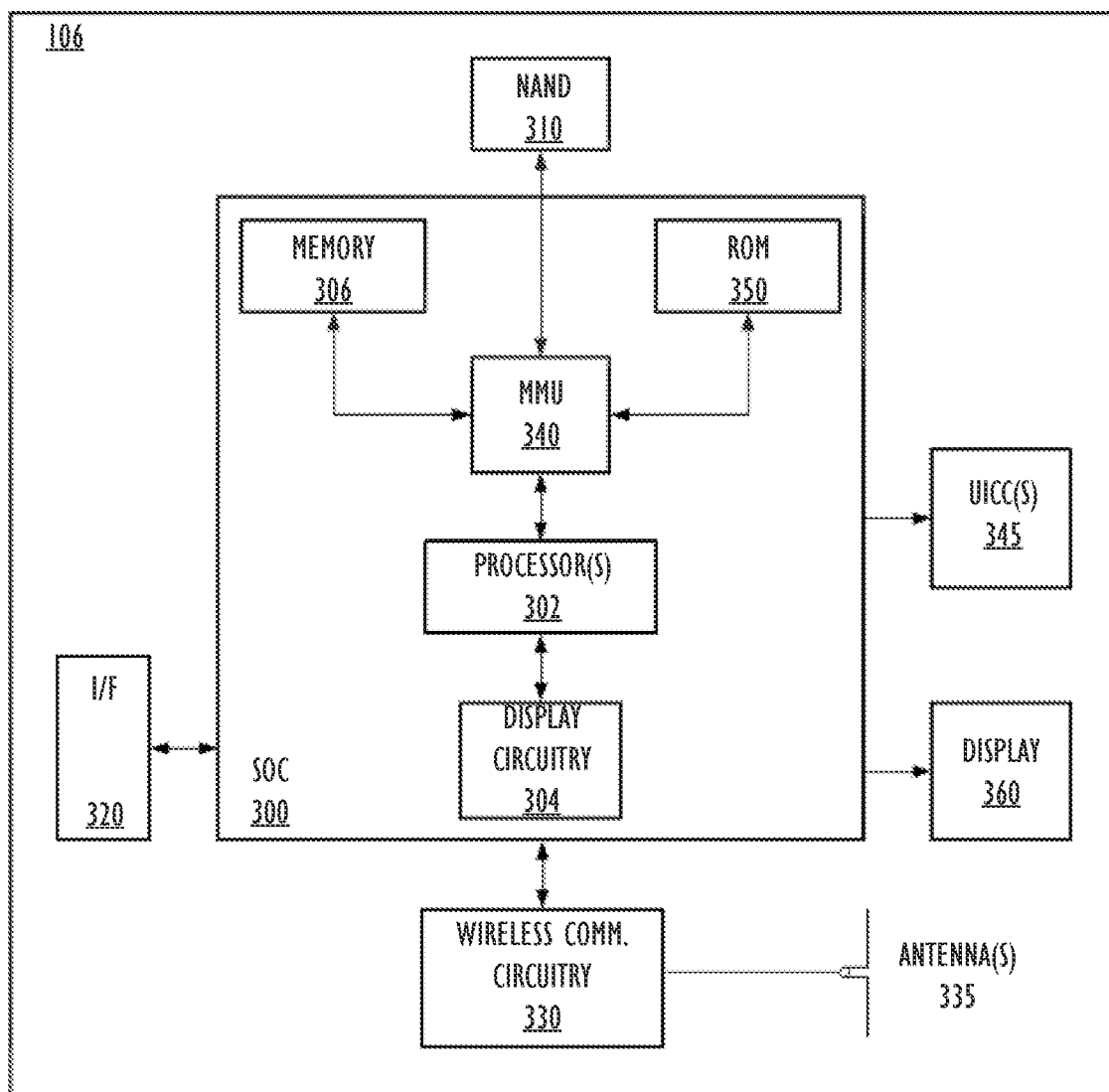
FIG. 3 illustrates an example block diagram of a UE, according to some Aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
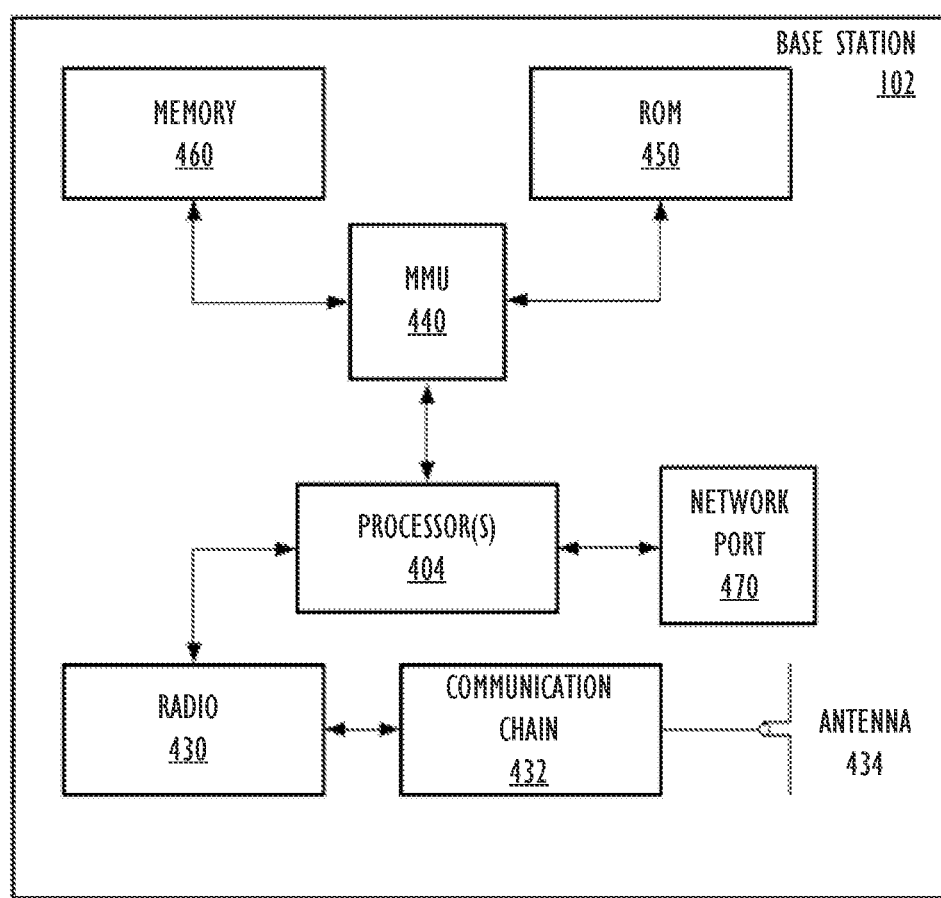
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
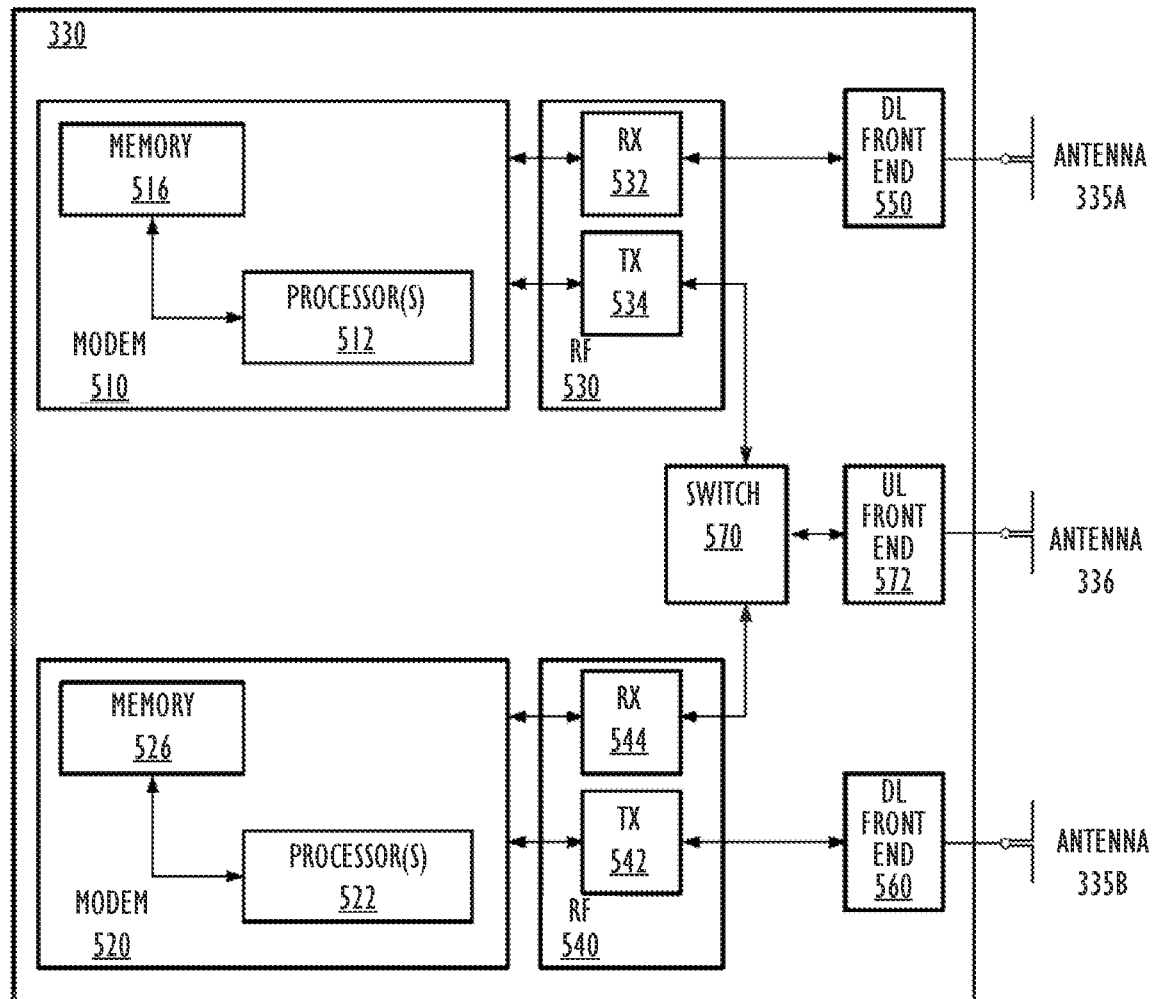
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
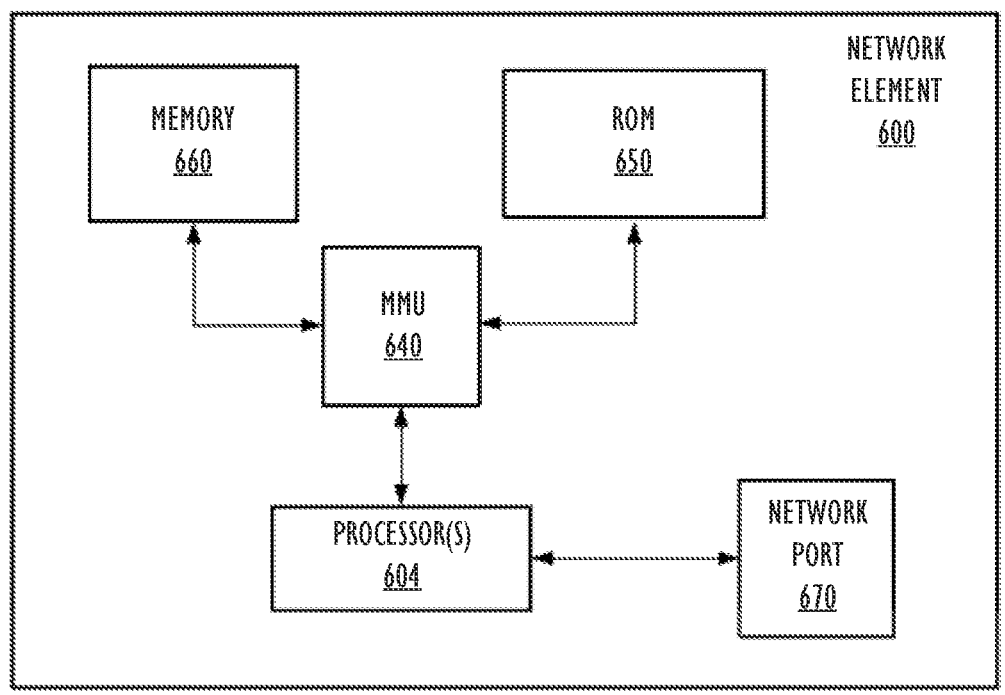
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Radio Resource Control (RRC) States

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in an RRC connected state (e.g., in which the wireless device can perform continuous data transfer, and in which handover between cells is managed by the network and access stratum (AS) context information is retained for the wireless device), or in an RRC idle state (e.g., in which the wireless device may operate in a more battery efficient state when not performing continuous data transfer, in which the wireless device may handle it's cell re-selection activities, and in which the network may not retain AS context information for the wireless device). In some cases, a wireless device may also operate in an RRC inactive state where the radio bearers with the network are suspended, but the AS context is still maintained by the wireless device and the wireless network, which helps enable quicker resumption back to the RRC connected state.

In some cases, when the wireless device is in the RRC connected state, the wireless device may continually monitor for the PDCCH transmission to the wireless device. Continually monitoring a channel can consume a substantial amount of power. For example, the RF front end and corresponding modem may need to remain powered on and one or more processors may be used to attempt to decode transmissions when monitoring the channel. To help reduce an amount of power used by wireless device, discontinuous reception (DRX) may be implemented in the RRC connected state. Using DRX, a wireless device may receive, from the wireless network, a schedule for when the wireless device should monitor the PDCCH and when the wireless device does not need to monitor the PDCCH. Together, an instance of time the wireless device should monitor the PDCCH, referred to as an on-duration, and an instance of time the wireless devices does not need to monitor the PDCCH, referred to as an off-duration, may be together comprise a DRX cycle. As the wireless device does not need to monitor the PDCCH during the off-duration, the wireless device may enter a relatively low power state (e.g., sleep, or other lower power state) as compared to the on-duration. For example, the wireless device may partially or completely power down the RF front end, modem, one or more processors, and/or other component that may be used to receive uplink transmissions during the off-duration. While monitoring the PDCCH during DRX on-durations reduces power consumption as compared to constantly monitoring the PDCCH, additional power savings can be had by not monitoring, e.g., skipping, the PDCCH during some DRX on-durations.

Figure 7:
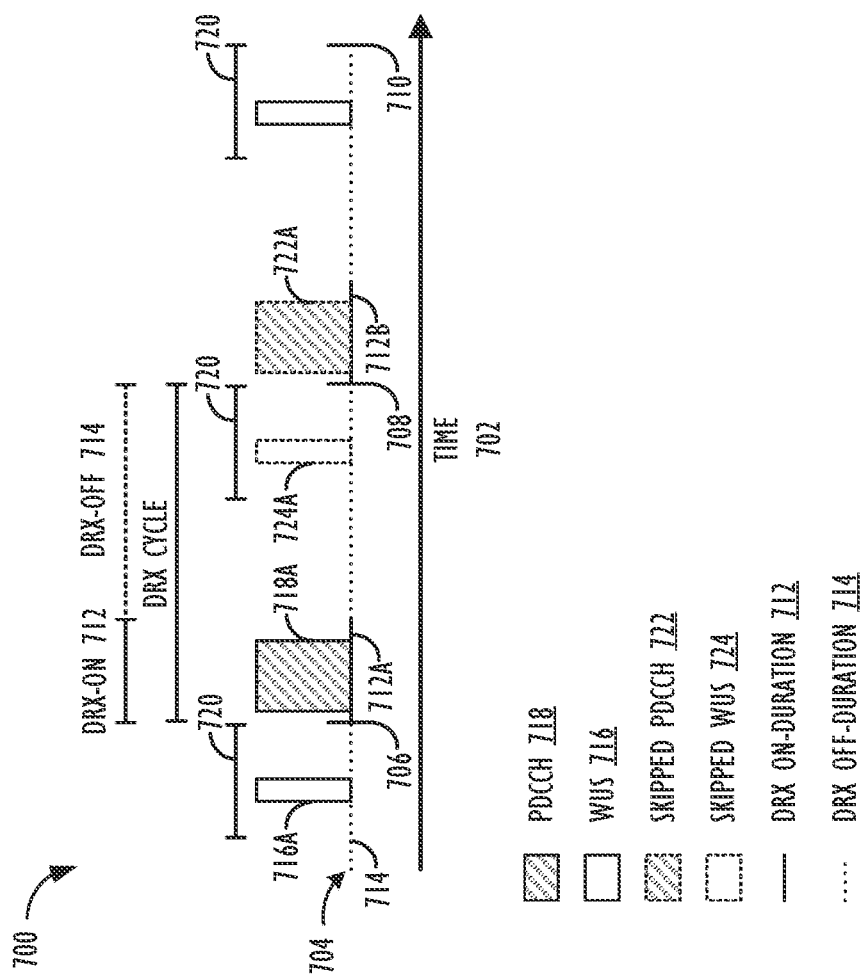
FIG. 7 is a timing diagram illustrating receiving a physical downlink control channel (PDCCH) based on a WUS, in accordance with aspects of the present disclosure.

Turning now to FIG. 7, a timing diagram 700 illustrating receiving a physical downlink control channel (PDCCH) based on a WUS, in accordance with aspects of the present disclosure. Timing diagram 700 illustrates relationships between WUS 716 transmissions and PDCCH 718 transmissions over multiple DRX cycles 704 on a time axis 702. As shown, the DRX cycles 704 includes a partial first DRX cycle which ends at time 706, a second DRX cycle starts at time 706 and ends at time 708, and a third DRX cycle starts at time 708 and ends at time 710. The second DRX cycle and third DRX cycles include an on-duration 712 and an off-duration 714, while the first DRX cycle includes an off-duration 714. It may be understood that the first DRX cycle may include an on-duration 712, but the on-duration 712 may have occurred prior to the time period illustrated in FIG. 7. In some cases, a wireless device may be configured to monitor for a WUS 716 transmitted by a wireless node prior to an on-duration 712 in which a PDCCH 718 may be transmitted. In this example, WUS 716A may be associated with and transmitted prior to PDCCH 718A during a time offset 720 prior to an on-duration 712A associated with the PDCCH 718A. If the wireless device receives the WUS 716A, the wireless device may monitor for the PDCCH 718A during the on-duration 712A. This process may be repeated for each DRX cycle. For example, the wireless device may monitor during a time offset 720 prior to on duration 712B for a WUS. If the wireless device does not receive the WUS (e.g., a skipped WUS 724A), the wireless device may not monitor for the PDCCH (e.g., a skipped PDCCH 722A) in the next on-duration 712B. For example, the wireless device may not start an on-duration timer during the next on-duration 712B (e.g., monitoring occasion for the PDCCH). The wireless device may enter or remain in a sleep or lower power state for all or a portion of the next on-duration 712B. The wireless device then repeats this process, monitoring for another WUS during a time offset 720 prior to another on-duration, and so forth.

A wireless device may receive, for example from a wireless node, a configuration message which configures connected mode DRX. In some cases, a configuration message may be received by a wireless device from a wireless network via a radio resource control (RRC) message. The configuration message may define the DRX cycles 704, for example, by providing DRX cycles 704 timing information. In some cases, the configuration message may also include information about a WUS 716. For example, the configuration message may indicate a time offset 720 from the start of a DRX on-duration 712. The time offset 720 may define a WUS monitoring occasion time period prior to the DRX on-duration 712 in which the wireless device may monitor for the WUS 716 signal. In some cases, the time offset 720 may have a predefined duration. In other cases, the time offset 720 may have a configurable duration, for example, as indicated in the configuration message.

In some cases, the WUS 716 may be a relatively short and simple signal as compared to the PDCCH 718. In some cases, a wireless device may have a dedicated, simplified, receiver for receiving the WUS 716 while using less power than a receiver for receiving the PDCCH 718. In some cases, a wireless device may use the same receiver for receiving the WUS 716 and PDCCH 718, but may be able to reduce an amount of power consumed by the receiver when receiving the WUS 716, for example by turning off some portions of the receiver, processor, etc. While monitoring for the WUS 716 during a prescribed interval can reduce power consumption as compared to monitoring for the PDCCH 718 during a prescribed interval, additional power savings may be obtained if the wireless device could skip monitoring for the WUS 716 during one or more WUS monitoring occasions. Skipping the WUS transmission may benefit the wireless network. For example, the wireless node may be able to use the skipped WUS monitoring occasions to service other wireless devices.

In accordance with aspects of the present disclosure, a WUS may be enhanced (e.g., EWUS) by adding additional information to the WUS to indicate to the UE whether the UE can skip monitoring for the WUS in a future WUS monitoring occasion. In some cases, a WUS signal may be transmitted as a DCI message, such as a DCI format 2_6 message, and bits may be added to the DCI message, indicating whether future WUS monitoring occasions may be skipped and if so, how many future WUS monitoring occasions may be skipped. For example, a single bit may be added to indicate whether to allow WUS monitoring occasions to be skipped, and a second bit may be added to indicate how many WUS monitoring occasions may be skipped. In some cases, there may be one or more WUS skip modes of operation.

For example, in a first enhanced WUS skip mode of operation, the wireless device may determine that the wireless device can skip one or more future WUS monitoring occasions while monitoring for the PDCCH messages associated with the one or more skipped WUSs. In the first WUS skip mode, a single WUS can indicate that the wireless device should monitor for multiple PDCCH messages, but that it may skip monitoring for the WUS associated with those multiple PDCCH messages.

Figure 8:
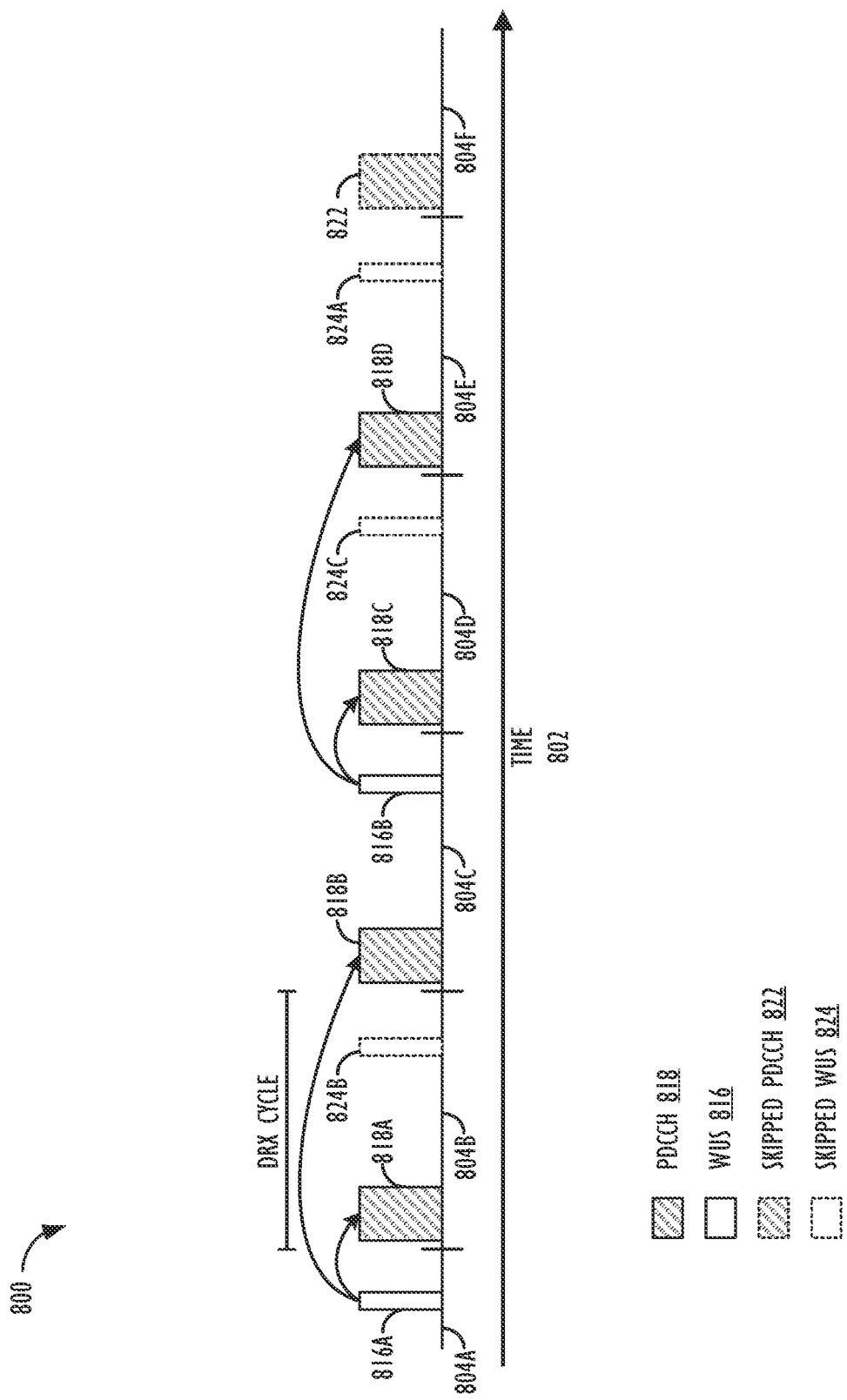
FIG. 8 is a timing diagram illustrating a first WUS skip mode of operation, in accordance with aspects of the present disclosure.

FIG. 8 is a timing diagram 800 illustrating a first WUS skip mode of operation, in accordance with aspects of the present disclosure. Timing diagram 800 also illustrates relationships between WUS 816 transmissions and PDCCH 818 transmissions over multiple DRX cycles 804A-804F on a time axis 802. In timing diagram 800, DRX on and off durations as well as monitoring intervals, as compared to FIG. 7, have been omitted for clarity.

In some cases, a WUS skip value may be encoded into the WUS 816 indicating whether or how many WUS monitoring occasions may be skipped. For example, the WUS skip value may be a bit added to the WUS 816 indicating whether the wireless device may skip a WUS monitoring occasion. In some cases, a WUS skip value of 0 may indicate that the wireless device may not skip a WUS monitoring occasion. In such cases the wireless device may then monitor for a PDCCH during the next on-duration and monitor for another WUS during the next WUS monitoring occasion, as discussed above with respect to FIG. 7. In some cases, a WUS skip value of 1 may indicate that the wireless device may skip a next WUS monitoring occasion. For example, a wireless node may determine that it needs to transmit multiple PDCCH messages to the wireless device over multiple DRX cycles, such as if the wireless device is sending or receiving data over a period of time. The wireless node may then transmit a first WUS 816A during a WUS monitoring occasion to the wireless device with an encoded skip value of 1. The wireless device may receive the first WUS 816A during the WUS monitoring occasion and decode the WUS. Where the WUS skip value is one, the wireless device may determine that the wireless device may skip one WUS monitoring occasion and monitor for one additional PDCCH occasion in addition to the next PDCCH monitoring occasion. For example, the UE may monitor for a first PDCCH 818A during the next on-duration in a second DRX cycle 804B as well as a second PDCCH 818B during the on-duration in a third DRX cycle 804C (e.g., the on-duration right after the next on-duration), without monitoring for skipped WUS 824B. After skipping WUS 824B, the wireless device may resume monitoring for a WUS during the next WUS interval and receive a second WUS 816B. This second WUS 816B may also include a WUS skip value of 1 the wireless device may skip monitoring for skipped WUS 824C while monitoring for PDCCH 818C and 818D. In some cases, if the wireless device does not receive the WUS, such as skipped WUS 824A in a fifth DRX cycle 804E, the wireless device may operate as described above with respect in FIG. 7 and not monitor for the PDCCH, such as skipped PDCCH 822 in a sixth DRX cycle 804F.

In some cases, the first WUS skip mode may be extended to support skipping additional WUS monitoring occasions. In some cases, the WUS skip value may represent a number of WUS monitoring occasions that may be skipped. For example, as discussed above, a WUS skip value of 0 may indicate that the wireless device should not skip a WUS monitoring occasion, while a WUS skip value of 1 may indicate that the wireless device may skip one WUS monitoring occasion. In some cases, higher WUS skip values may be treated similarly. For example, a second bit may be added to a WUS, enabling up to 4 values (e.g., 0-3) to be encoded in the WUS skip value.

Figure 9:
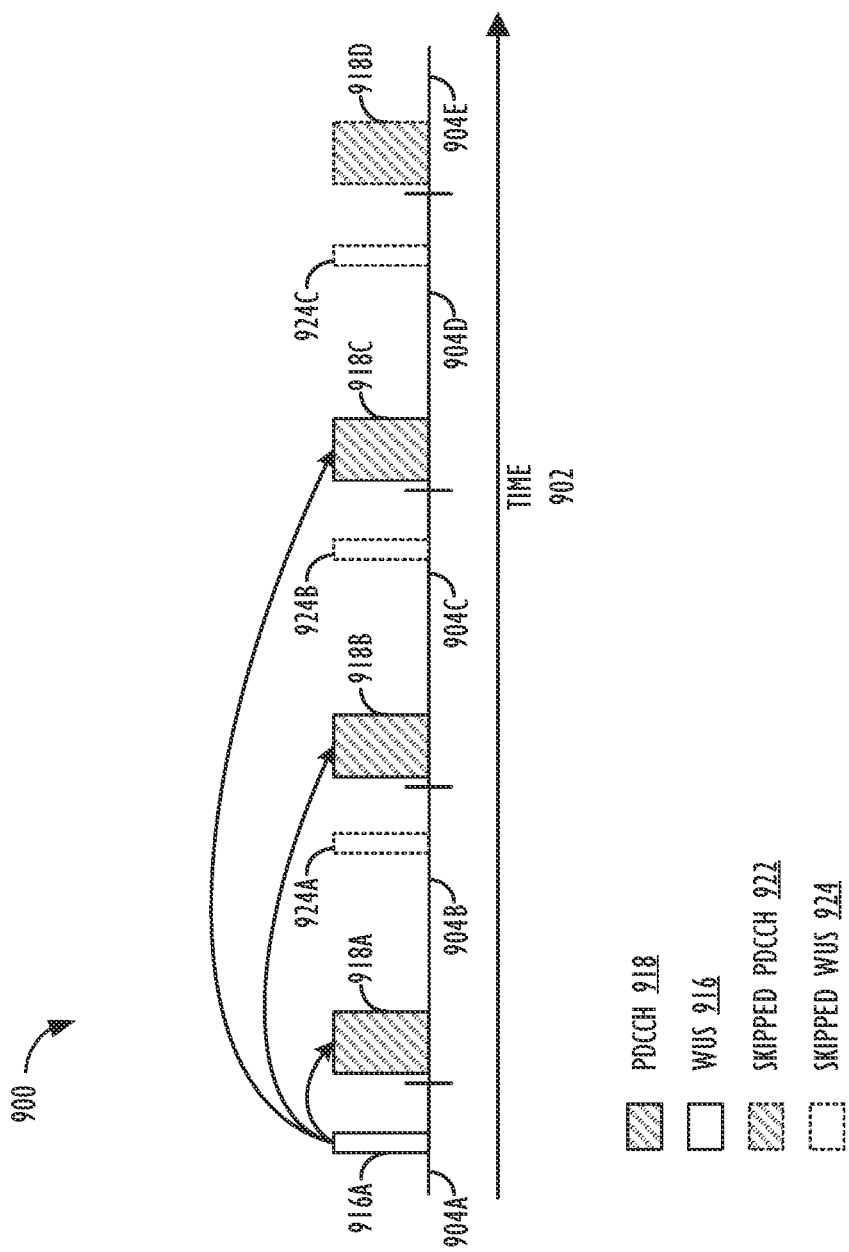
FIG. 9 is a timing diagram illustrating a first WUS skip mode of operation, in accordance with aspects of the present disclosure.

FIG. 9 is a timing diagram 900 illustrating a first WUS skip mode of operation, in accordance with aspects of the present disclosure. In FIG. 9, a wireless device may receive a first WUS 916A during the WUS monitoring occasion and decode the first WUS 916A. In this example, the WUS skip value is two, and the wireless device may determine that the wireless device may skip monitoring for two skipped WUS 924A, 924B in DRX cycles 904B and 904C, respectively, and monitor for two additional PDCCH 918B, 918C in DRX cycles 904C and 904D, respectively, in addition to monitoring for the next PDCCH 918A in DRX cycle 904B. In some cases, if the wireless device does not receive the WUS, such as skipped WUS 924C in a fourth DRX cycle 804D, the wireless device may operate as described above with respect in FIGS. 7 and 8 and not monitor for the PDCCH, such as skipped PDCCH 922 in a fifth DRX cycle 904E. Similarly, if the WUS skip value is three, the wireless device may skip monitoring for three skipped WUS monitoring occasions and monitor for three additional PDCCH monitoring occasions in addition to monitoring in the next PDCCH monitoring occasion. In some cases, a number of skipped WUS monitoring occasions may be limited as it may be difficult for a wireless node to accurately schedule that far in advance. For example, the number of skipped WUS monitoring occasions may be limited to 3.

In some cases, in a second WUS skip mode of operation, the wireless device may determine that the wireless device can skip one or more future WUS monitoring occasions along with the PDCCH monitoring occasions associated with the one or more skipped WUS monitoring occasions. This mode of operation may be useful if a wireless node determines that the wireless device does not need to send or receive data for a period of time. For example, a wireless node may determine that a wireless device is sending or receiving data periodically with relatively large gaps between transmissions, or the wireless node may have multiple, relatively small sets of non-time critical data for a wireless device, the wireless node may batch up the data and send the data to the wireless device all together. By reducing a number of transmissions, the wireless device may be able to reduce an amount of power consumption and stay in a lower power state longer.

In some cases, in this second WUS skip mode of operation, a WUS skip value may also be encoded into the WUS. In a manner similar to that discussed in conjunction with FIGS. 7 and 8 and the first WUS skip mode of operation, the WUS skip value may be encoded as one or two bits in the WUS. In some cases, a WUS skip value of 0 may indicate that the wireless device may not skip a WUS monitoring occasion. In some cases, a WUS skip value of one may indicate that the wireless device may skip one WUS monitoring occasion along with an associated PDCCH monitoring occasion. Similarly, a WUS skip value of two or three may indicate that the wireless device may skip a corresponding number of WUS monitoring occasions along with the respective, associated, PDCCH monitoring occasions.

Figure 10:
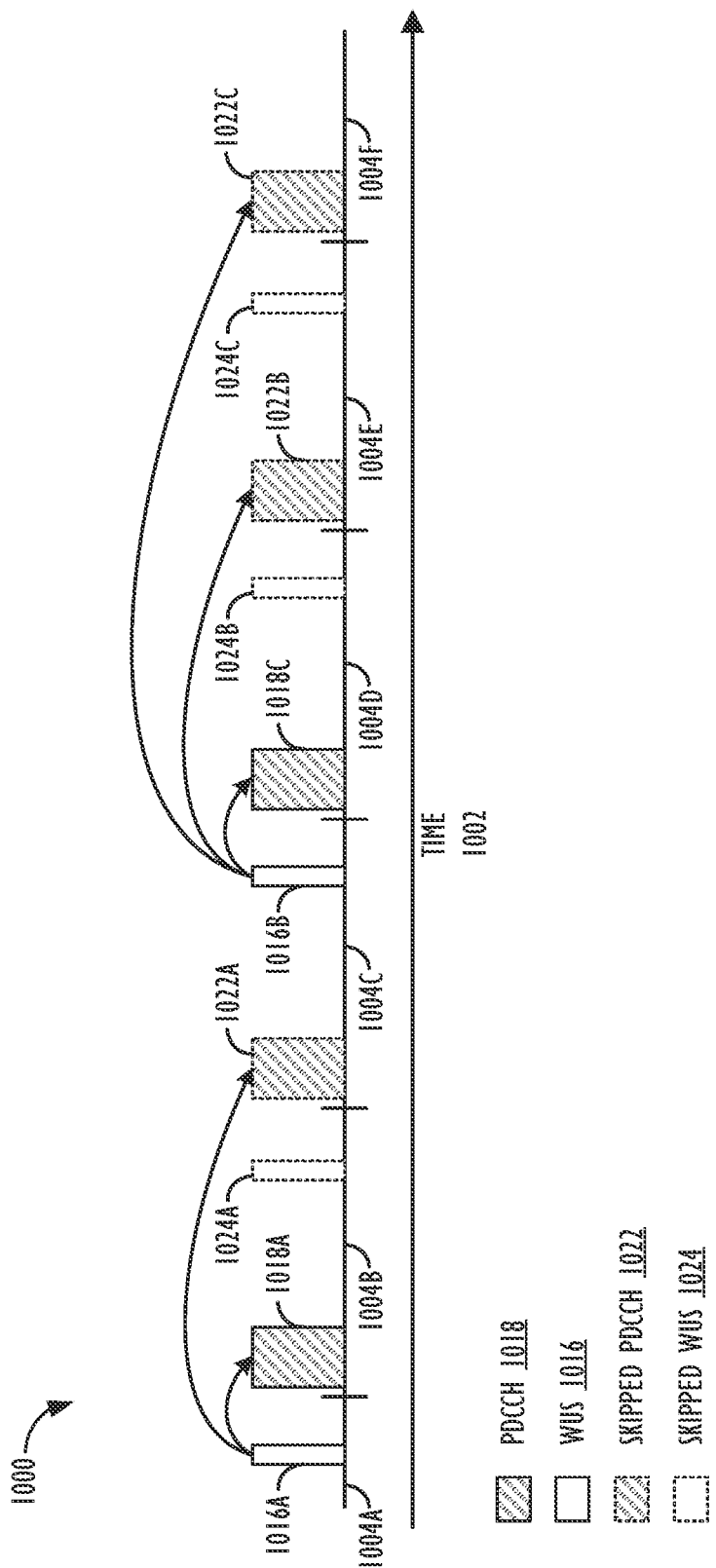
FIG. 10 is a timing diagram illustrating a second WUS skip mode of operation, in accordance with aspects of the present disclosure.

FIG. 10 is a timing diagram 1000 illustrating a second WUS skip mode of operation, in accordance with aspects of the present disclosure. In a first example in FIG. 10, a wireless device may receive and decode a first WUS 1016A in a first DRX cycle 1004A to determine that the WUS skip value is one. The wireless device may then determine that the wireless device may not monitor for a skipped WUS 1024A in a second DRX cycle 1004B. The wireless device may also not monitor for skipped PDCCH 1022A in a third DRX cycle 1004C associated with the skipped WUS 1024A. The wireless device may still monitor for the next PDCCH 1018A in the second DRX cycle 1004B associated with the first WUS 1016A.

In another example in FIG. 10, the wireless device may decode a second WUS 1016B in a third DRX cycle 1004C to determine that the WUS skip value is two. The wireless device may then determine that the wireless device may not monitor for two WUS monitoring occasions, such as skipped WUS 1024B and 1024C. The wireless device may also not monitor for two skipped PDCCH 1022B and 1022C associated with skipped WUS 1024B and 1024C, respectively. Similarly, if the WUS skip value is three, the wireless device may skip monitoring for three skipped WUS monitoring occasions and monitor for three additional PDCCH monitoring occasions in addition to monitoring in the next PDCCH monitoring occasion. In some cases, additional bits may be added to allow for any number of WUS skip values to be specified. In some cases, the number of WUS skip values may be limited, such as to three WUS monitoring occasions, due to scheduling limitations.

In some cases, the WUS may include an indication of which WUS skip mode of operation to use. For example, the WUS may include a bit indicating whether the wireless device may operate under the first WUS skip mode, or the second WUS skip mode of operation. In some cases, the WUS skip mode of operation may be signaled to the wireless device using signaling different from the WUS. For example, the WUS skip mode may be indicated in a configuration message or dedicated signaling, such as a MAC CE or broadcast signaling for UEs associated with one or more wireless nodes.

In some cases, specific behaviors may be mapped to values of the WUS skip value. For example, WUS skip values may be mapped to one or more patterns for skipping WUS monitoring occasions, such as skipping every other monitoring occasion until changed. As another example, a default WUS skip value may be predefined, such as in a specification, and the default WUS skip value may be applied when no skip value is provided, or the default WUS skip value may always applied.

In some cases, the enhanced WUS may also be applied in the RRC idle and RRC inactive modes. For example, in the RRC inactive/idle modes, the wireless node may indicate, to the wireless device, a paging interval (e.g., a DRX cycle for paging). Further, the wireless device may be configured with a WUS monitoring occasion prior to the paging interval. The wireless node may transmit an enhanced WUS and indicate whether the wireless device can skip one or more future WUS monitoring occasions in a manner similar to that discussed above in conjunction with FIGS. 8-10. Similarly, the enhanced WUS may indicate whether the wireless device may skip or more future paging intervals in a manner similar to that discussed above in conjunction with FIG. 10.

Figure 11A:
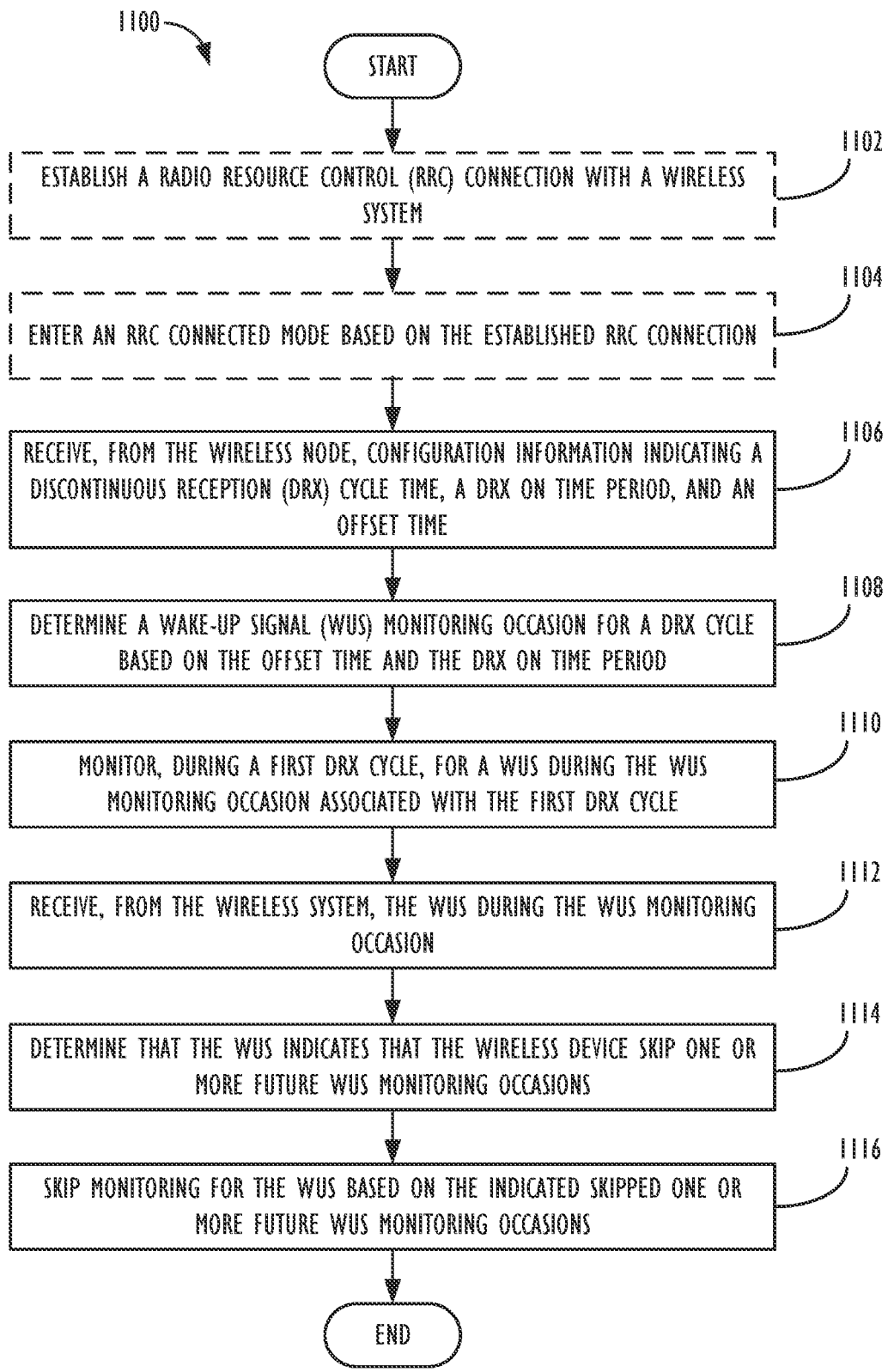
FIGS. 11A and 11B illustrate a technique for power saving for a wireless device, in accordance with aspects of the present disclosure.
Figure 11B:
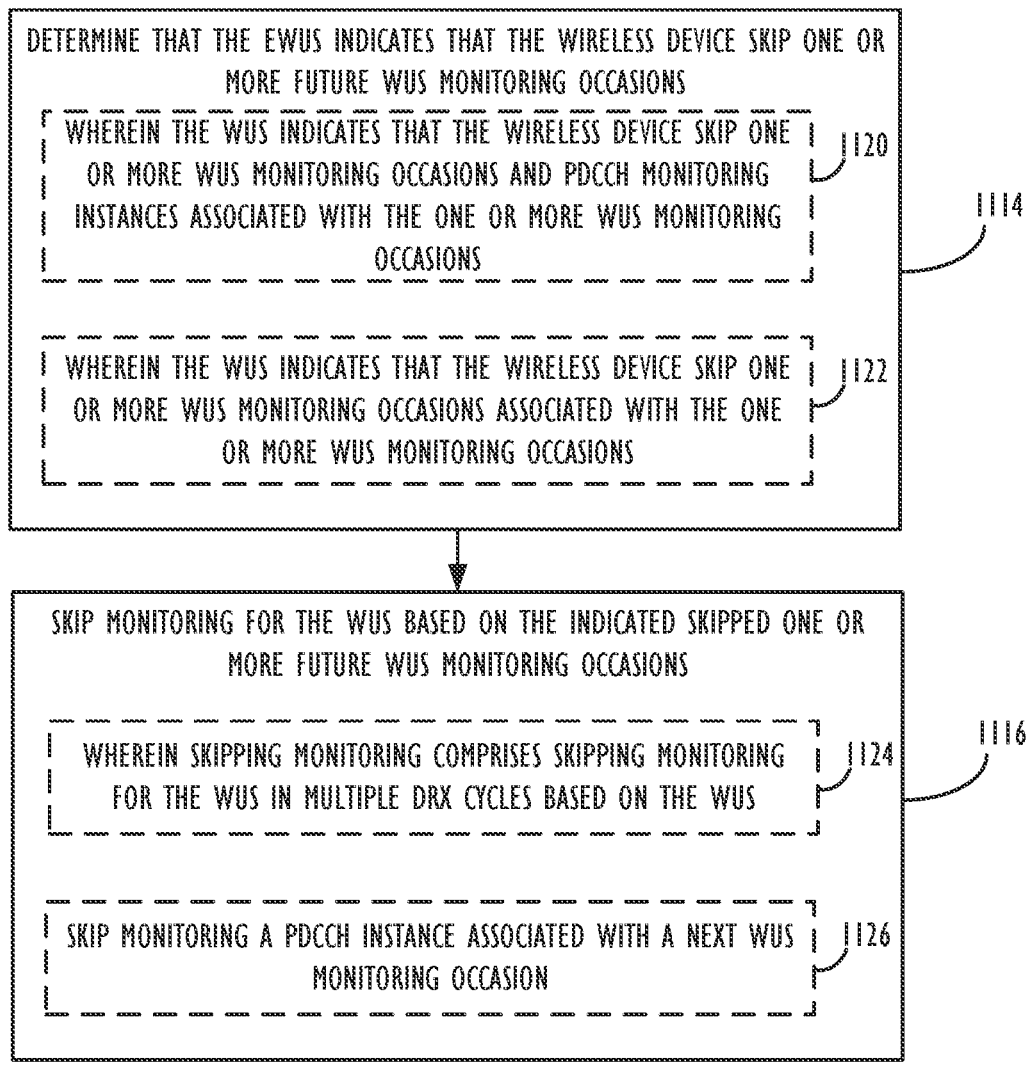

FIGS. 11A and 11B illustrate a technique for power saving for a wireless device, in accordance with aspects of the present disclosure. In FIG. 11A, exemplary wireless device behaviors 1100 are described. At step 1102, a radio resource control (RRC) connection with a wireless system may be established. At step 1104, an RRC connected mode may be entered based on the established RRC connection. For example, a wireless device may establish an RRC connection with a wireless node and the wireless mode may enter an RRC connected mode. In some cases, step 1102 and step 1104 may be optional. For example, the wireless device may be in an RRC idle mode. As another example, the wireless device may have established an RRC connection with the wireless system, but is in an RRC inactive mode. At step 1106, configuration information may be received from the wireless node indicating a discontinuous reception (DRX) cycle time, a DRX on time period, and an offset time. For example, the wireless device may receive a configuration message including information defining a DRX cycle and WUS timing information. At step 1108, a WUS monitoring occasion may be determined for a DRX cycle based on the offset time and the DRX on time period. For example, a WUS monitoring occasion may be determined based on the offset time from the DRX on-duration. At step 1110, the wireless device may monitor, during a first DRX cycle, for a WUS during the WUS monitoring occasion associated with the first DRX cycle. For example, the wireless device may monitor for a WUS during a first WUS monitoring occasion. At step 1112, the wireless device may receive, from the wireless system, the WUS during the WUS monitoring occasion. For example, the wireless device may receive a DCI message indicating that the wireless device should monitor the PDCCH during a next PDCCH monitoring occasion. At step 1114, the wireless device may determine that the WUS indicates that the wireless device skip one or more future WUS monitoring occasions. For example, the WUS may include an encoded WUS skip value indicating that the wireless device may skip one or more WUS monitoring occasions. At step 1116, the wireless device may skip monitoring for the WUS based on the indicated skipped one or more future WUS monitoring occasions.

FIG. 11B describes optional behaviors of the exemplary wireless device behaviors 1100. At step 1120, the WUS may indicate that the wireless device skip one or more WUS monitoring occasions and PDCCH monitoring instances associated with the one or more WUS monitoring occasions. For example, in the second WUS skip mode of operation, the wireless device may skip one or more WUS monitoring occasions. The wireless device may also skip one or more PDCCH monitoring occasions associated with the skipped one or more WUS monitoring occasions. At step 1122, the WUS may indicate that the wireless device skip one or more WUS monitoring occasions associated with the one or more WUS monitoring occasions. For example, in the first WUS skip mode of operation, the wireless device may skip one or more WUS monitoring occasions. In some cases, for either the first or second WUS skip mode of operation, the WUS may include an encoded value indicating a number of WUS monitoring occasions to skip. In some cases, the WUS may include an indication whether to skip monitoring a PDCCH instance associated with a WUS monitoring occasion.

Figure 12A:
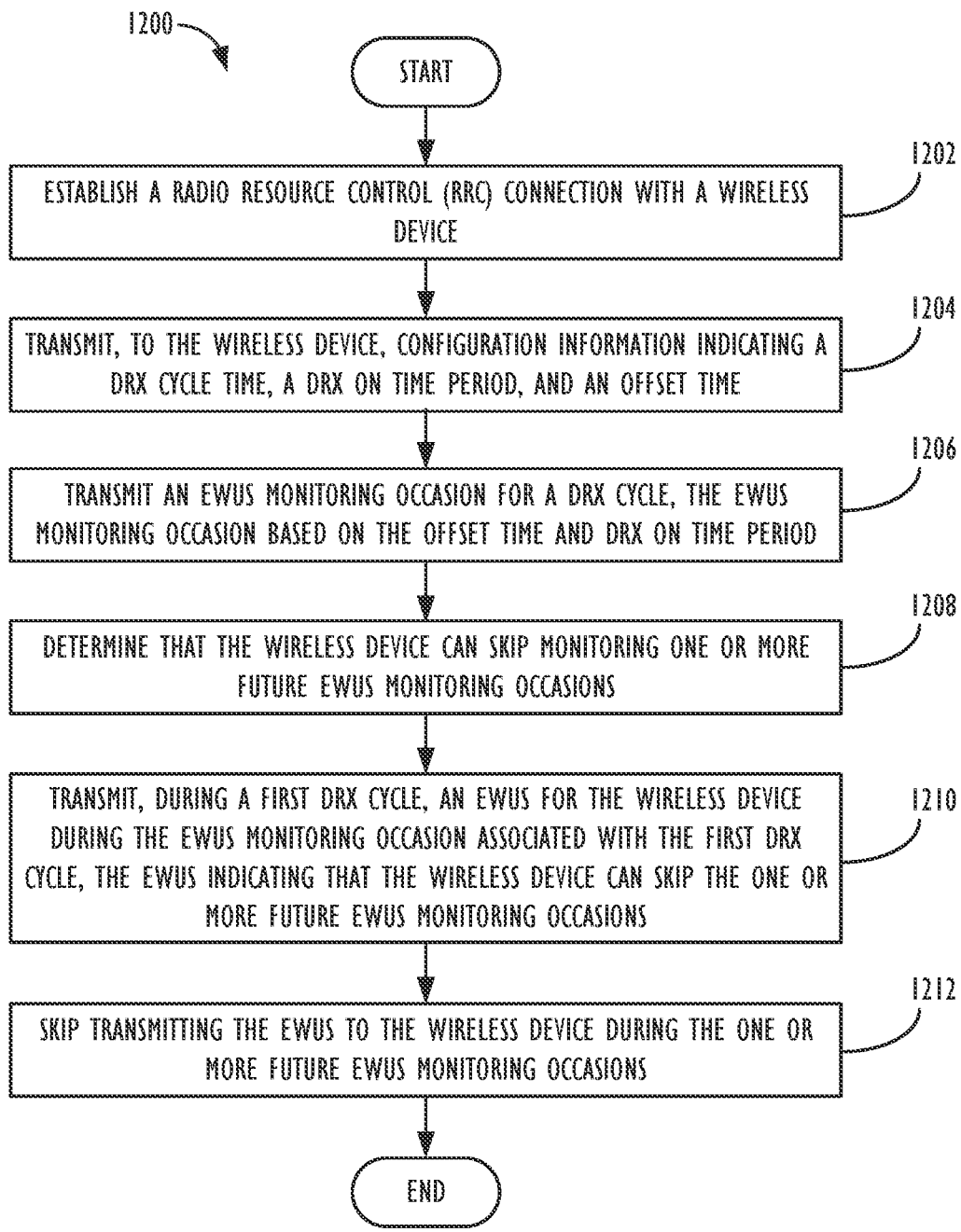
FIGS. 12A and 12B illustrate a technique for power saving, by a wireless node, in accordance with aspects of the present disclosure.
Figure 12B:
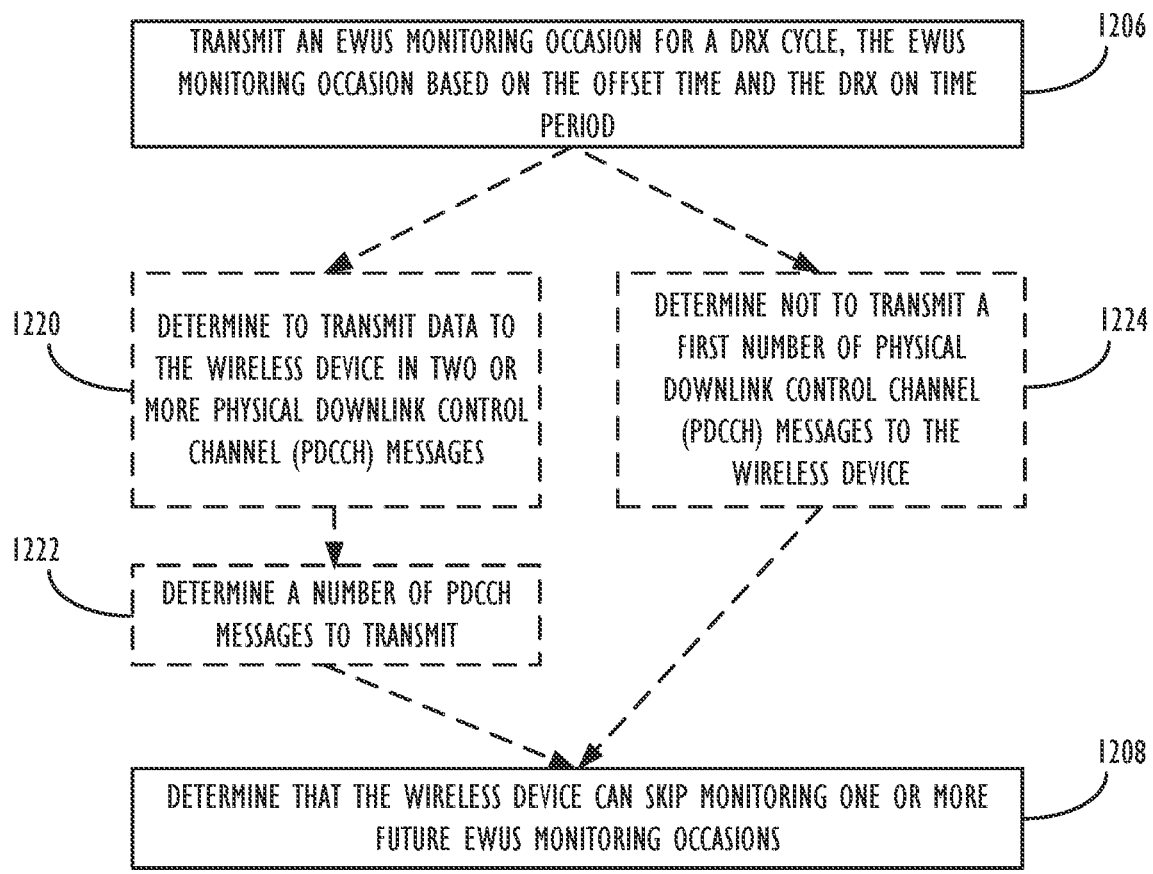

FIGS. 12A and 12B illustrate a technique for power saving, by a wireless node, in accordance with aspects of the present disclosure. In FIG. 12A, exemplary wireless node behaviors 1200 are described. At step 1202, a radio resource control (RRC) connection with a wireless device may be established. For example, a wireless device may establish an RRC connection with the wireless node and the wireless device may enter an RRC connected mode. At step 1204, configuration information may be transmitted to the wireless node indicating a discontinuous reception (DRX) cycle time, a DRX on time period, and an offset time. For example, the wireless node may determine a DRX cycle and WUS timing information for the wireless device. At step 1206, a wake-up signal (WUS) monitoring occasion for a DRX cycle, the WUS based on the offset time, and the DRX on time period may be transmitted to the wireless device. For example, the wireless node may transmit a configuration message indicating the determined DRX cycle and WUS timing information to the wireless device. At step 1208, a determination may be made that the wireless device can skip monitoring one or more future WUS monitoring occasions. For example, the wireless node may determine that the wireless node has data to transmit to the wireless device in two or more PDCCH messages. The wireless node may determine a number of PDCCH messages to use, for example based on an amount of data to transmit. The number of future WUS monitoring occasions that may be skipped may be based on the number of PDCCH messages. As another example, the wireless node may determine not to transmit a number of PDCCH messages to the wireless device. The number of future WUS monitoring occasions that may be skipped may be based on the determined number of PDCCH messages not to transmit.

At step 1210, during a first DRX cycle, a WUS for the wireless device may be transmitted during the WUS monitoring occasion associated with the first DRX cycle, the WUS indicating that the wireless device can skip the one or more future WUS monitoring occasions. For example, the WUS may be transmitted as a DCI message. In some cases, the WUS may also indicate whether to skip monitoring a PDCCH instance associated with a WUS monitoring occasion. In some cases, the WUS includes an encoded value indicating a number of WUS monitoring occasions and PDCCH monitoring instances associated with the multiple WUS monitoring occasions based on a pattern. At step 1212, transmitting the WUS to the wireless device during the one or more future WUS monitoring occasions may be skipped.

FIG. 12B describes optional behaviors of the exemplary wireless node behaviors 1200. At step 1220, the wireless node may determine that the wireless node has data to transmit to the wireless device in two or more PDCCH messages. For example, the wireless node may have data for the wireless device that requires multiple PDCCH messages to transmit. The wireless node may, for example in the first WUS skip mode of operation, indicate to the wireless device to skip one or more WUS monitoring occasions while still monitoring multiple PDCCH monitoring occasions. At step 1222, the wireless node determines a number of PDCCH messages to transmit. At step 1224, the wireless node may determine not to transmit a number of PDCCH messages to the wireless device. For example, the wireless node may determine that a that the wireless device can skip one or more future WUS monitoring occasions along with the PDCCH monitoring occasions associated with the one or more skipped WUS monitoring occasions.

Note that dashed lines around boxes and dashed arrows in FIGS. 11B and 12B indicate optional steps that may be performed.

Examples

In the following sections, further exemplary aspects are provided.

According to Example 1, a method for power saving for a wireless device, comprising: establishing a radio resource control (RRC) connection with a wireless system; entering an RRC connected mode based on the established RRC connection; receiving, from the wireless system, configuration information indicating a discontinuous reception (DRX) cycle time, a DRX on time period, and an offset time; determining an enhanced wake-up signal (EWUS) monitoring occasion for a DRX cycle based on the offset time and the DRX on time period; monitoring, during a first DRX cycle, for an EWUS during the EWUS monitoring occasion associated with the first DRX cycle; receiving, from the wireless system, the EWUS during the EWUS monitoring occasion; determining that the EWUS indicates that the wireless device skip one or more future EWUS monitoring occasions; and skipping monitoring for the EWUS based on the indicated skipped one or more future EWUS monitoring occasions.

Example 2 comprises the subject matter of example 1 and further comprises: determining the EWUS indicates that the wireless device monitor a physical downlink control channel (PDCCH) instance in a next DRX cycle, wherein the PDCCH instance is associated with the EWUS monitoring occasion; and monitoring the PDCCH instance in the next DRX cycle based on the EWUS.

Example 3 comprises the subject matter of example 2 and further comprises skipping monitoring a PDCCH instance associated with a next EWUS monitoring occasion.

Example 4 comprises the subject matter of example 1, wherein the EWUS indicates that the wireless device skip multiple EWUS monitoring occasions and PDCCH monitoring instances associated with the multiple EWUS monitoring occasions, and wherein skipping monitoring comprises skipping monitoring for the EWUS in multiple DRX cycles based on the EWUS.

Example 5 comprises the subject matter of example 4, wherein the EWUS includes an encoded value indicating a number of EWUS monitoring occasions to skip.

Example 6 comprises the subject matter of example 5, wherein the encoded value is encoded in two bits of a downlink control message.

Example 7 comprises the subject matter of example 1, wherein the EWUS indicates that the wireless device skip multiple EWUS monitoring occasions, and wherein skipping monitoring comprises skipping monitoring for the EWUS in multiple DRX cycles based on the EWUS.

Example 8 comprises the subject matter of example 7 and further comprising: determining the EWUS indicates that the wireless device monitor physical downlink control channel (PDCCH) instances in the multiple DRX cycles, and monitoring the PDCCH instances in the multiple DRX cycles based on the indication based on the EWUS.

Example 9 comprises the subject matter of example 7, wherein the EWUS includes an encoded value indicating a number of EWUS monitoring occasions to skip.

Example 10 comprises the subject matter of example 1, wherein the EWUS indicates whether to skip monitoring a PDCCH instance associated with a EWUS monitoring occasion.

Example 11 comprises the subject matter of example 1, wherein the EWUS is transmitted in a downlink control message.

Example 12 comprises the subject matter of example 1, wherein the EWUS is associated with a predetermined default number of EWUS monitoring occasions to skip.

According to Example 13, a method for power saving for a wireless device, comprising: receiving, from the wireless system, configuration information indicating a discontinuous reception (DRX) cycle time, a DRX on time period, and an offset time; determining an enhanced wake-up signal (EWUS) monitoring occasion for a DRX cycle based on the offset time and the DRX on time period; monitoring, during a first DRX cycle, for an EWUS during the EWUS monitoring occasion associated with the first DRX cycle; receiving, from the wireless system, the EWUS during the EWUS monitoring occasion; determining that the EWUS indicates that the wireless device skip one or more future EWUS monitoring occasions; and skipping monitoring for the EWUS based on the indicated skipped one or more future EWUS monitoring occasions.

Example 14 comprises the subject matter of example 13, wherein the wireless device is in an RRC idle mode.

Example 15 comprises the subject matter of example 13, wherein the wireless device is in an RRC inactive mode.

According to Example 16, a wireless device comprising: an antenna; a radio operably coupled to the antenna; and a processor operably coupled to the radio; wherein the wireless device is configured to: establish a radio resource control (RRC) connection with a wireless system; enter an RRC connected mode based on the established RRC connection; receive, from the wireless system, configuration information indicating a discontinuous reception (DRX) cycle time, a DRX on time period, and an offset time; determine an enhanced wake-up signal (EWUS) monitoring occasion for a DRX cycle based on the offset time and the DRX on time period; monitor, during a first DRX cycle, for an EWUS during the EWUS monitoring occasion associated with the first DRX cycle; receive, from the wireless system, the EWUS during the EWUS monitoring occasion; determine that the EWUS indicates that the wireless device skip one or more future EWUS monitoring occasions; and skip monitoring for the EWUS based on the indicated skipped one or more future EWUS monitoring occasions.

Example 17 comprises the subject matter of example 16, wherein the wireless device is further configured to: determine the EWUS indicates that the wireless device monitor a physical downlink control channel (PDCCH) instance in a next DRX cycle, wherein the PDCCH instance is associated with the EWUS monitoring occasion; and monitor the PDCCH instance in the next DRX cycle based on the EWUS.

Example 18 comprises the subject matter of example 17, wherein the wireless device is further configured to skip monitoring a PDCCH instance associated with a next EWUS monitoring occasion.

Example 19 comprises the subject matter of example 16, wherein the EWUS indicates that the wireless device skip multiple EWUS monitoring occasions and PDCCH monitoring instances associated with the multiple EWUS monitoring occasions, and wherein the wireless device is further configured to skip monitoring by skipping monitoring for the EWUS in multiple DRX cycles based on the EWUS.

Example 20 comprises the subject matter of example 16, wherein the EWUS includes an encoded value indicating a number of EWUS monitoring occasions to skip.

Example 21 comprises the subject matter of example 20, wherein the encoded value is encoded in two bits of a downlink control message.

Example 22 comprises the subject matter of example 16, wherein the EWUS indicates that the wireless device skip multiple EWUS monitoring occasions, and wherein the wireless device is further configured to skip monitoring by skipping monitoring for the EWUS in multiple DRX cycles based on the EWUS.

Example 23 comprises the subject matter of example 22, wherein the wireless device is further configured to: determine the EWUS indicates that the wireless device monitor physical downlink control channel (PDCCH) instances in the multiple DRX cycles; and monitor the PDCCH instances in the multiple DRX cycles based on the indication based on the EWUS.

Example 24 comprises the subject matter of example 22, wherein the EWUS includes an encoded value indicating a number of EWUS monitoring occasions to skip.

Example 25 comprises the subject matter of example 16, wherein the EWUS indicates whether to skip monitoring a PDCCH instance associated with a EWUS monitoring occasion.

Example 26 comprises the subject matter of example 16, wherein the EWUS is transmitted in a downlink control message.

Example 27 comprises the subject matter of example 16, wherein the EWUS is associated with a predetermined default number of EWUS monitoring occasions to skip.

According to Example 28, a method for power saving for a wireless device, comprising: receiving, from the wireless system, configuration information indicating a discontinuous reception (DRX) cycle time, a DRX on time period, and an offset time; determining an enhanced wake-up signal (EWUS) monitoring occasion for a DRX cycle based on the offset time and the DRX on time period; monitoring, during a first DRX cycle, for an EWUS during the EWUS monitoring occasion associated with the first DRX cycle; receiving, from the wireless system, the EWUS during the EWUS monitoring occasion; determining that the EWUS indicates that the wireless device skip one or more future EWUS monitoring occasions; and skipping monitoring for the EWUS based on the indicated skipped one or more future EWUS monitoring occasions.

Example 29 comprises the subject matter of example 28, wherein the wireless device is in an RRC idle mode.

Example 30 comprises the subject matter of example 28, wherein the wireless device is in an RRC inactive mode.

According to Example 31, a method for power saving, comprising establishing a radio resource control (RRC) connection with a wireless device; transmitting, to the wireless device, configuration information indicating a discontinuous reception (DRX) cycle time, a DRX on time period, and an offset time; transmitting an enhanced wake-up signal (EWUS) monitoring occasion for a DRX cycle, the EWUS monitoring occasion based on the offset time and the DRX on time period; determining that the wireless device can skip monitoring one or more future EWUS monitoring occasions; transmitting, during a first DRX cycle, a EWUS for the wireless device during the EWUS monitoring occasion associated with the first DRX cycle, the EWUS indicating that the wireless device can skip the one or more future EWUS monitoring occasions; and skipping transmitting the EWUS to the wireless device during the one or more future EWUS monitoring occasions.

Example 32 comprises the subject matter of Example 31, wherein the EWUS indicates that the wireless device monitor a physical downlink control channel (PDCCH) instance in a next DRX cycle, wherein the PDCCH instance is associated with the EWUS monitoring occasion.

Example 33 comprises the subject matter of Example 31, and further comprising: determining to transmit data to the wireless device in two or more physical downlink control channel (PDCCH) messages; and determining a number of PDCCH messages to transmit, and w % herein the one or more future EWUS monitoring occasions are determined based on the number of PDCCH messages to transmit.

Example 34 comprises the subject matter of Example 33, wherein the EWUS includes an encoded value indicating a number of EWUS monitoring occasions to skip.

Example 35 comprises the subject matter of Example 31, wherein skipping transmitting the EWUS comprises skipping transmitting the EWUS in a next EWUS monitoring occasion, and further comprising skipping transmitting a PDCCH message associated with the next EWUS monitoring occasion.

Example 36 comprises the subject matter of example 31, further comprising determining not to transmit a first number of physical downlink control channel (PDCCH) messages to the wireless device, wherein the first number is two or more, wherein the EWUS indicates the first number of skipped EWUS transmissions to the wireless device, and wherein skipping transmitting the EWUS includes skipping transmitting a PDCCH message associated with the skipped EWUS transmission.

Example 37 comprises the subject matter of example 31, wherein the EWUS includes an encoded value indicating a number of EWUS monitoring occasions and PDCCH monitoring instances associated with the multiple EWUS monitoring occasions to skip.

Example 38 comprises the subject matter of Example 31, wherein the EWUS is transmitted in a downlink control message.

Example 39 comprises the subject matter of Example 31, wherein the EWUS indicates whether to skip monitoring a PDCCH instance associated with a EWUS monitoring occasion.

Example 40 comprises the subject matter of Example 31, wherein the EWUS is associated with a predetermined default number of EWUS monitoring occasions to skip.

According to Example 41, a device comprising: an antenna; a radio operably coupled to the antenna; and a processor operably coupled to the radio, wherein the device is configured to: establish a radio resource control (RRC) connection with a wireless device; transmit, to the wireless device, configuration information indicating a discontinuous reception (DRX) cycle time, a DRX on time period, and an offset time; transmit an enhanced wake-up signal (EWUS) monitoring occasion for a DRX cycle, the EWUS monitoring occasion based on the offset time and the DRX on time period; determine that the wireless device can skip monitoring one or more future EWUS monitoring occasions; transmit, during a first DRX cycle, a EWUS for the wireless device during the EWUS monitoring occasion associated with the first DRX cycle, the EWUS indicating that the wireless device can skip the one or more future EWUS monitoring occasions; and skip transmitting the EWUS to the wireless device during the one or more future EWUS monitoring occasions.

Example 42 comprises the subject matter of Example 41, wherein the EWUS indicates that the wireless device monitor a physical downlink control channel (PDCCH) instance in a next DRX cycle, wherein the PDCCH instance is associated with the EWUS monitoring occasion.

Example 43 comprises the subject matter of Example 41, wherein the device is further configured to: determine to transmit data to the wireless device in two or more physical downlink control channel (PDCCH) messages; and determine a number of PDCCH messages to transmit, and wherein the one or more future EWUS monitoring occasions are determined based on the number of PDCCH messages to transmit.

Example 44 comprises the subject matter of Example 43, wherein the EWUS includes an encoded value indicating a number of EWUS monitoring occasions to skip.

Example 45 comprises the subject matter of Example 41, wherein the device is configured to skip transmitting the EWUS by skipping transmitting the EWUS in a next EWUS monitoring occasion; and wherein the device is further configured to skip transmitting a PDCCH message associated with the next EWUS monitoring occasion.

Example 46 comprises the subject matter of Example 41, wherein the device is further configured to determine not to transmit a first number of physical downlink control channel (PDCCH) messages to the wireless device, wherein the first number is two or more, wherein the EWUS indicates the first number of skipped EWUS transmissions to the wireless device, and wherein skipping transmitting the EWUS includes skipping transmitting a PDCCH message associated with the skipped EWUS transmission.

Example 47 comprises the subject matter of Example 41, wherein the EWUS includes an encoded value indicating a number of EWUS monitoring occasions and PDCCH monitoring instances associated with the multiple EWUS monitoring occasions to skip.

Example 48 comprises the subject matter of Example 41, wherein the EWUS is transmitted in a downlink control message.

Example 49 comprises the subject matter of Example 41, wherein the EWUS indicates whether to skip monitoring a PDCCH instance associated with a EWUS monitoring occasion.

Example 50 comprises the subject matter of Example 41, wherein the EWUS is associated with a predetermined default number of EWUS monitoring occasions to skip.

According to Example 51, a non-transitory computer readable medium comprising computer readable code executable by a processor to: establish a radio resource control (RRC) connection with a wireless device; transmit, to the wireless device, configuration information indicating a discontinuous reception (DRX) cycle time, a DRX on time period, and an offset time; transmit an enhanced wake-up signal (EWUS) monitoring occasion for a DRX cycle, the EWUS monitoring occasion based on the offset time and the DRX on time period; determine that the wireless device can skip monitoring one or more future EWUS monitoring occasions; transmit, during a first DRX cycle, an EWUS for the wireless device during the EWUS monitoring occasion associated with the first DRX cycle, the EWUS indicating that the wireless device can skip the one or more future EWUS monitoring occasions; and skip transmitting the EWUS to the wireless device during the one or more future EWUS monitoring occasions.

Example 52 comprises the subject matter of Example 51, wherein the EWUS indicates that the wireless device monitor a physical downlink control channel (PDCCH) instance in a next DRX cycle, wherein the PDCCH instance is associated with the EWUS monitoring occasion.

Example 53 comprises the subject matter of Example 51, wherein the device is further configured to: determine to transmit data to the wireless device in two or more physical downlink control channel (PDCCH) messages; and determine a number of PDCCH messages to transmit, and wherein the one or more future EWUS monitoring occasions are determined based on the number of PDCCH messages to transmit.

Example 54 comprises the subject matter of Example 53, wherein the EWUS includes an encoded value indicating a number of EWUS monitoring occasions to skip.

Example 55 comprises the subject matter of Example 51, wherein the device is configured to skip transmitting the EWUS by skipping transmitting the EWUS in a next EWUS monitoring occasion; and wherein the device is further configured to skip transmitting a PDCCH message associated with the next EWUS monitoring occasion.

Example 56 comprises the subject matter of Example 51, wherein the device is further configured to determine not to transmit a first number of physical downlink control channel (PDCCH) messages to the wireless device, wherein the first number is two or more, wherein the EWUS indicates the first number of skipped EWUS transmissions to the wireless device, and wherein skipping transmitting the EWUS includes skipping transmitting a PDCCH message associated with the skipped EWUS transmission.

Example 57 comprises the subject matter of Example 51, wherein the EWUS includes an encoded value indicating a number of EWUS monitoring occasions and PDCCH monitoring instances associated with the multiple EWUS monitoring occasions to skip.

Example 58 comprises the subject matter of Example 51, wherein the EWUS is transmitted in a downlink control message.

Example 59 comprises the subject matter of Example 51, wherein the EWUS indicates whether to skip monitoring a PDCCH instance associated with a EWUS monitoring occasion.

Example 60 comprises the subject matter of Example 51, wherein the EWUS is associated with a predetermined default number of EWUS monitoring occasions to skip.

According to Example 61, a method that includes any action or combination of actions as substantially described herein in the Detailed Description.

According to Example 62, a method as substantially described herein with reference to each or any combination of the Figures included herein or with reference to each or any combination of paragraphs in the Detailed Description.

According to Example 63, a wireless device configured to perform any action or combination of actions as substantially described herein in the Detailed Description as included in the wireless device.

According to Example 64, a wireless station configured to perform any action or combination of actions as substantially described herein in the Detailed Description as included in the wireless station.

According to Example 65, a non-volatile computer-readable medium that stores instructions that, when executed, cause the performance of any action or combination of actions as substantially described herein in the Detailed Description.

According to Example 66, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for power saving, comprising:
establishing a radio resource control (RRC) connection with a wireless device;
transmitting, to the wireless device, configuration information indicating a discontinuous reception (DRX) cycle time, a DRX on time period, and an offset time;
transmitting an enhanced wake-up signal (EWUS) monitoring occasion for a DRX cycle, the EWUS monitoring occasion based on the offset time and the DRX on time period;
determining that the wireless device can skip monitoring one or more future EWUS monitoring occasions;
transmitting, during a first DRX cycle, a EWUS for the wireless device during the EWUS monitoring occasion associated with the first DRX cycle, the EWUS indicating that the wireless device can skip the one or more future EWUS monitoring occasions, wherein the EWUS includes an encoded value indicating a number of EWUS monitoring occasions and PDCCH monitoring instances associated with the one or more future EWUS monitoring occasions to skip; and
skipping transmitting the EWUS to the wireless device during the one or more future EWUS monitoring occasions.

2. The method of claim 1, wherein the EWUS indicates that the wireless device monitor a physical downlink control channel (PDCCH) instance in a next DRX cycle, wherein the PDCCH instance is associated with the EWUS monitoring occasion.

3. The method of claim 1, further comprising:
determining to transmit data to the wireless device in two or more physical downlink control channel (PDCCH) messages; and
determining a number of PDCCH messages to transmit, and wherein the one or more future EWUS monitoring occasions are determined based on the number of PDCCH messages to transmit.

4. The method of claim 1, wherein skipping transmitting the EWUS comprises skipping transmitting the EWUS in a next EWUS monitoring occasion, and further comprising skipping transmitting a PDCCH message associated with the next EWUS monitoring occasion.

5. The method of claim 1, further comprising determining not to transmit a first number of physical downlink control channel (PDCCH) messages to the wireless device, wherein the first number is two or more.

6. A device comprising:
an antenna;
a radio operably coupled to the antenna; and
a processor operably coupled to the radio;
wherein the device is configured to:
establish a radio resource control (RRC) connection with a wireless device;
transmit, to the wireless device, configuration information indicating a discontinuous reception (DRX) cycle time, a DRX on time period, and an offset time;
transmit an enhanced wake-up signal (EWUS) monitoring occasion for a DRX cycle, the EWUS monitoring occasion based on the offset time and the DRX on time period;
determine that the wireless device can skip monitoring one or more future EWUS monitoring occasions;
transmit, during a first DRX cycle, a EWUS for the wireless device during the EWUS monitoring occasion associated with the first DRX cycle, the EWUS indicating that the wireless device can skip the one or more future EWUS monitoring occasions, wherein the EWUS includes an encoded value indicating a number of EWUS monitoring occasions and PDCCH monitoring instances associated with the one or more future EWUS monitoring occasions to skip; and
skip transmitting the EWUS to the wireless device during the one or more future EWUS monitoring occasions.

7. The device of claim 6, wherein the EWUS indicates that the wireless device monitor a physical downlink control channel (PDCCH) instance in a next DRX cycle, wherein the PDCCH instance is associated with the EWUS monitoring occasion.

8. The device of claim 6, wherein the device is further configured to:
determine to transmit data to the wireless device in two or more physical downlink control channel (PDCCH) messages; and
determine a number of PDCCH messages to transmit, and wherein the one or more future EWUS monitoring occasions are determined based on the number of PDCCH messages to transmit.

9. The device of claim 6, wherein the EWUS is transmitted in a downlink control message.

10. The device of claim 6, wherein the EWUS indicates whether to skip monitoring a PDCCH instance associated with a EWUS monitoring occasion.

11. The device of claim 6, wherein the EWUS is associated with a predetermined default number of EWUS monitoring occasions to skip.

12. A non-transitory computer readable medium comprising computer readable code executable by a processor to:
establish a radio resource control (RRC) connection with a wireless device;
transmit, to the wireless device, configuration information indicating a discontinuous reception (DRX) cycle time, a DRX on time period, and an offset time;
transmit an enhanced wake-up signal (EWUS) monitoring occasion for a DRX cycle, the EWUS monitoring occasion based on the offset time and the DRX on time period;
determine that the wireless device can skip monitoring one or more future EWUS monitoring occasions;
transmit, during a first DRX cycle, a EWUS for the wireless device during the EWUS monitoring occasion associated with the first DRX cycle, the EWUS indicating that the wireless device can skip the one or more future EWUS monitoring occasions, wherein the EWUS includes an encoded value indicating a number of EWUS monitoring occasions and PDCCH monitoring instances associated with the one or more future EWUS monitoring occasions to skip; and
skip transmitting the EWUS to the wireless device during the one or more future EWUS monitoring occasions.

13. The non-transitory computer readable medium of claim 12, wherein the EWUS indicates that the wireless device monitor a physical downlink control channel (PDCCH) instance in a next DRX cycle, wherein the PDCCH instance is associated with the EWUS monitoring occasion.

14. The non-transitory computer readable medium of claim 12, wherein the device is further configured to:
determine to transmit data to the wireless device in two or more physical downlink control channel (PDCCH) messages; and determine a number of PDCCH messages to transmit, and wherein the one or more future EWUS monitoring occasions are determined based on the number of PDCCH messages to transmit.

15. The non-transitory computer readable medium of claim 12, wherein the device is configured to skip transmitting the EWUS by skipping transmitting the EWUS in a next EWUS monitoring occasion; and wherein the device is further configured to skip transmitting a PDCCH message associated with the next EWUS monitoring occasion.

16. The non-transitory computer readable medium of claim 12, wherein the device is further configured to determine not to transmit a first number of physical downlink control channel (PDCCH) messages to the wireless device, wherein the first number is two or more.

* * * * *